United States Patent
Fichou et al.

(10) Patent No.: US 10,110,445 B2
(45) Date of Patent: Oct. 23, 2018

(54) CLOSED CONTROL LOOPS FOR DATA CENTERS

(71) Applicant: AT&T Global Network Services France, SAS, Courbevoie (FR)

(72) Inventors: Aline Fichou, La Colle sur Loup (FR); Aurelien Bruno, Colomars (FR)

(73) Assignee: AT&T Global Network Services France, SAS, Courbevoie (FR)

( * ) Notice: Subject to any disclaimer, the term of this patent is extended or adjusted under 35 U.S.C. 154(b) by 151 days.

(21) Appl. No.: 14/499,166

(22) Filed: Sep. 27, 2014

(65) Prior Publication Data
US 2016/0094412 A1   Mar. 31, 2016

(51) Int. Cl.
| H04L 12/24 | (2006.01) |
| H04L 29/08 | (2006.01) |
| H04L 12/26 | (2006.01) |
| H04L 29/14 | (2006.01) |

(52) U.S. Cl.
CPC ...... *H04L 41/5009* (2013.01); *H04L 41/5025* (2013.01); *H04L 43/08* (2013.01); *H04L 43/16* (2013.01); *H04L 67/16* (2013.01); *H04L 67/18* (2013.01); *H04L 69/40* (2013.01); *H04L 41/5022* (2013.01); *H04L 43/0852* (2013.01)

(58) Field of Classification Search
None
See application file for complete search history.

(56) References Cited

U.S. PATENT DOCUMENTS

| 7,742,830 B1 | 6/2010 | Botes |
| 7,821,939 B2 | 10/2010 | DeCusatis et al. |
| 8,365,009 B2 | 1/2013 | Dournov et al. |
| 8,489,834 B1 | 7/2013 | Kumbhari |
| 2011/0209146 A1* | 8/2011 | Box ............... G06F 9/5077 718/1 |
| 2011/0258621 A1* | 10/2011 | Kern ............... G06F 9/5072 718/1 |
| 2012/0204187 A1* | 8/2012 | Breiter ............ G06F 9/5072 718/105 |
| 2012/0226733 A1 | 9/2012 | Kim et al. |
| 2012/0272249 A1* | 10/2012 | Beaty ............. G06F 9/5083 719/318 |
| 2012/0297238 A1* | 11/2012 | Watson ........... G06F 9/5088 714/4.11 |

(Continued)

OTHER PUBLICATIONS

Bennani et al., "Resource Allocation for Autonomic Data Centers Using Analytic Performance Models," 2005 IEEE Intl'. Conf. on Autonomic Computing, Jun. 13-16, 2005, Seattle, Washington.

*Primary Examiner* — Philip Chea
*Assistant Examiner* — Hassan Khan
(74) *Attorney, Agent, or Firm* — Hartman & Citrin LLC

(57) ABSTRACT

Concepts and technologies are disclosed herein for providing a closed control loop for data centers. The data centers can receive monitoring data that can include congestion data and class of service data. The data centers can store the monitoring data in a data storage device, analyze the monitoring data, and determine that a performance threshold is satisfied. In response to a determination that the performance threshold is met, the data centers can determine that a time-based threshold is met. In response to a determination that the time-based threshold is met, the data centers can adjust execution of a hosted service.

20 Claims, 6 Drawing Sheets

(56) References Cited

U.S. PATENT DOCUMENTS

| | | | |
|---|---|---|---|
| 2013/0080642 A1* | 3/2013 | Adam | G06F 15/173 |
| | | | 709/226 |
| 2013/0326507 A1 | 12/2013 | McGrath et al. | |
| 2014/0053151 A1 | 2/2014 | Heninger et al. | |
| 2014/0075029 A1 | 3/2014 | Lipchuk et al. | |
| 2014/0278337 A1* | 9/2014 | Branson | G06F 11/3457 |
| | | | 703/22 |
| 2015/0288592 A1* | 10/2015 | Baughman | H04L 43/16 |
| | | | 709/224 |

\* cited by examiner

CLOSED CONTROL LOOPS FOR DATA CENTERS

BACKGROUND

Virtualization has given rise to the data center. A data center can include a collection of computing and/or storage resources such as server computers, disk arrays, and/or other computing resources. In some instances, data centers can be hosted in or include one or more server farms or the like. By moving services and/or applications into data centers, the network and application environment can be more agile and responsive to various conditions, as such changes may not require moving hardware. Rather, software can be moved from hardware at one data center to hardware at a second data center when services are created, modified, or terminated.

In some instances, changes made to applications and/or other services can be permanent changes and can be triggered using Web portals accessible by various customers. The changes also can include activation of services and/or providing access to existing applications and/or resources. Because of virtualization, activation and/or movement of services can be accomplished in some cases in a matter of seconds. Because of the ability to rapidly create and/or change applications, it can be difficult for cloud providers to dimension data centers and/or associated access bandwidth. As a result, customers may experience degradation of performance.

SUMMARY

The present disclosure is directed to providing and using closed control loops for data centers. The control loops can control data centers based on data center access bandwidth monitoring and can allow cloud providers to relocate applications or other hosted services based on customer demand. The changes at the application level can occur in a few minutes or even less, depending upon cloud provider preferences. The changes also can occur within the data centers without control from outside of the data centers.

According to various embodiments, a data center can include one or more server computers, one or more of which can host an application, module, service, or other data (hereinafter referred to as a "hosted service"). The data center can communicate with a customer, for example via exchange of traffic with the customer over a network, a portion thereof, or a network path. A computing device operating outside of the data center can monitor traffic on the network. The computing device can generate monitoring data that can include congestion data and class of service data. The congestion data can indicate congestion at the network and/or a portion thereof, and the class of service data can indicate class of service at the network and/or a portion thereof. The monitoring data can include other data or information that can indicate other conditions at the network and/or a portion thereof.

The computing device can provide the monitoring data to the data center and/or the data center can obtain the monitoring data from the computing device in other ways. The data center can store the monitoring data. The data center also can, via execution of a control application, analyze one or more versions or iterations of the monitoring data and one or more thresholds. The control application can determine, based upon the analysis of the monitoring data and/or the thresholds, network conditions between the data center and one or more users such as the customer. Thus, the data center can determine, based upon the analysis, if performance degradation exists on the network, a portion thereof, along the network path, and/or elsewhere.

If the data center determines that the performance degradation exists based upon a performance threshold being met, the data center can also determine if a time-based threshold such as a cycle threshold or a time threshold is met. Thus, the data center can determine, in the case of a cycle threshold, if a number of satisfactions of the congestion threshold or class of service threshold meets a defined number of cycles specified by the cycle threshold. Alternatively, the data center can determine, in the case of a time threshold, if a number of satisfactions of the congestion threshold or class of service threshold have occurred within a time defined by the time threshold. The time-based thresholds can be used to normalize network conditions by ignoring spikes in congestion and/or dips in class of service unless the spikes or dips occur a number of times, or unless the spikes or dips occur two or more times within a specified time period.

If the data center determines that the time-based threshold is met, the data center can also determine whether or not the condition indicated by the monitoring data is an extreme case of performance degradation. In some embodiments, multiple levels or thresholds can be defined for the congestion, class of service, and/or other thresholds. As such, the data center can determine if the condition indicated by the monitoring data satisfies a first threshold that may indicate performance degradation and/or a second threshold that may indicate an extreme case of performance degradation. If the data center determines that the first threshold is met but the second threshold is not met, the data center can be configured to adjust execution of the hosted service. If the data center determines that the first threshold is met and the second threshold is also met, the data center can be configured to relocate the hosted service to another location such as other data centers.

Thus, embodiments of the concepts and technologies described herein can provide a closed control loop for a data center. Network data can be collected outside of the data center and provided to the data center as monitoring data. The data centers can make decisions on adjusting and/or moving applications or other hosted services without control from outside entities such as controllers, orchestrators, or the like. Thus, data centers can autonomously adjust service execution and/or locations of hosted services to take into account network conditions. Some embodiments of the concepts and technologies described herein can improve execution of the applications or other services, as well as customer experience.

According to one aspect of the concepts and technologies disclosed herein, a method is disclosed. The method can include receiving, at a processor executing a control application, monitoring data including congestion data and class of service data. The method also can include storing, by the processor, the monitoring data in a data storage device, analyzing, by the processor, the monitoring data, and determining, by the processor, that a performance threshold is satisfied. In response to a determination that the performance threshold is met, the method can include determining, by the processor that a time-based threshold is met, and in response to a determination that the time-based threshold is met, adjusting execution of a hosted service.

In some embodiments, adjusting execution of the hosted service can include determining, by the processor, that a threshold level is satisfied by the monitoring data, in response to a determination that the threshold level is satisfied, determining, by the processor, that extreme performance degradation exists, and relocating, by the processor, the hosted service to a new data center. In some embodiments, adjusting execution of the hosted service can include determining, by the processor, that a threshold level is not satisfied by the monitoring data, and in response to a determination that the threshold level is not satisfied, adjusting, by the processor, execution of the hosted service to improve performance of the hosted service without relocating the hosted service to a new data center.

In some embodiments, the time-based threshold can include a cycle threshold that defines a number of cycles. The performance degradation can be ignored until the cycle threshold is satisfied. In some embodiments, the time-based threshold can include a time threshold that defines a time period. The performance degradation can be ignored unless the time threshold is satisfied by detecting satisfaction of the performance threshold twice during the time period. In some embodiments, the performance threshold can include a congestion threshold, and the congestion threshold can include two or more threshold levels.

In some embodiments, the performance threshold can include a class of service threshold, and the class of service threshold can include two or more threshold levels. In some embodiments, the performance threshold can include a congestion threshold. The congestion data can be generated based upon congestion measured along a network path between the hosted service and a customer, and the congestion data can be compared to the congestion threshold. In some embodiments, the performance threshold can include a class of service threshold, the class of service data can be generated based upon a class of service measured along a network path between the hosted service and a customer, and the class of service data can be compared to the class of service threshold.

According to another aspect of the concepts and technologies disclosed herein, a system is disclosed. The system can include a processor and a memory. The memory can store computer-executable instructions that, when executed by the processor, cause the processor to perform operations. The operations can include receiving monitoring data including congestion data and class of service data, storing the monitoring data in a data storage device, analyzing the monitoring data, determining that a performance threshold is satisfied, in response to a determination that the performance threshold is met, determining, by the processor that a time-based threshold is met, and in response to a determination that the time-based threshold is met, adjusting execution of a hosted service.

In some embodiments, adjusting execution of the hosted service can include determining that a threshold level is satisfied by the monitoring data, in response to a determination that the threshold level is satisfied, determining that extreme performance degradation exists, and relocating the hosted service to a new data center. In some embodiments, adjusting execution of the hosted service can include determining that a threshold level is not satisfied by the monitoring data, and in response to a determination that the threshold level is not satisfied, adjusting execution of the hosted service to improve performance of the hosted service without relocating the hosted service to a new data center.

In some embodiments, the time-based threshold can include a cycle threshold that defines a number of cycles. The performance degradation can be ignored until the cycle threshold is satisfied. In some embodiments, the time-based threshold can include a time threshold that defines a time period. The performance degradation can be ignored unless the time threshold is satisfied by detecting satisfaction of the performance threshold twice or more during the time period. In some embodiments, the performance threshold can include a congestion threshold, and the congestion threshold can include two or more threshold levels. In some embodiments, the performance threshold can include a class of service threshold, and the class of service threshold can include two or more threshold levels.

According to yet another aspect, a computer storage medium is disclosed. The computer storage medium can have computer-executable instructions stored thereon that, when executed by a processor, cause the processor to perform operations. The operations can include receiving monitoring data including congestion data and class of service data, storing the monitoring data in a data storage device, analyzing the monitoring data, determining that a performance threshold is satisfied, in response to a determination that the performance threshold is met, determining, by the processor that a time-based threshold is met, and in response to a determination that the time-based threshold is met, adjusting execution of a hosted service.

In some embodiments, adjusting execution of the hosted service can include determining that a threshold level is satisfied by the monitoring data, in response to a determination that the threshold level is satisfied, determining that extreme performance degradation exists, and relocating the hosted service to a new data center. In some embodiments, adjusting execution of the hosted service can include determining that a threshold level is not satisfied by the monitoring data, and in response to a determination that the threshold level is not satisfied, adjusting execution of the hosted service to improve performance of the hosted service without relocating the hosted service to a new data center. In some embodiments, the time-based threshold can include a cycle threshold that defines a number of cycles and a time threshold that defines a time period, and the performance threshold can include a congestion threshold and a class of service threshold.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1A:
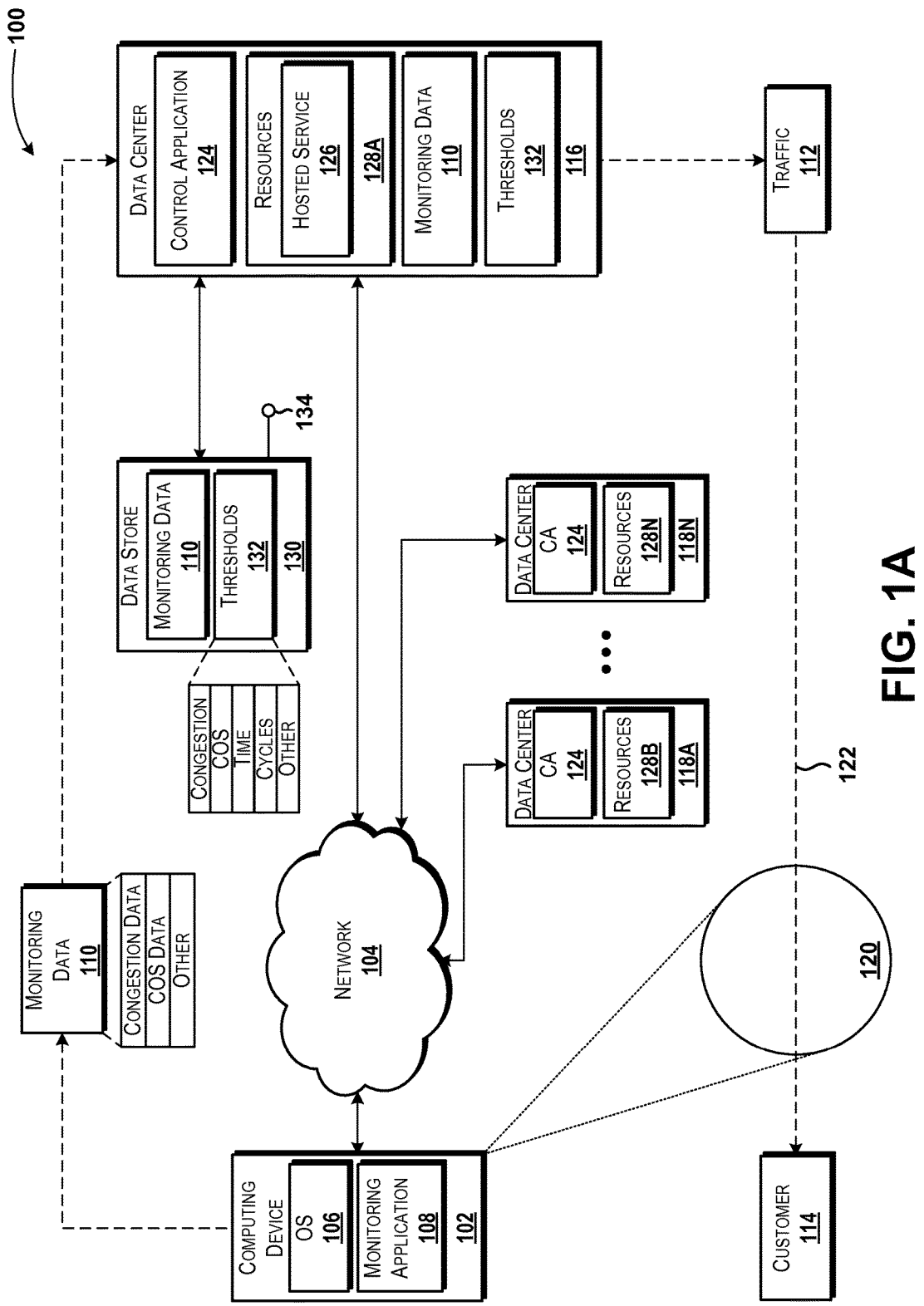
FIGS. 1A-1B are system diagrams illustrating illustrative operating environments for various embodiments of the concepts and technologies described herein.

The following detailed description is directed to creating and using closed control loops for data centers. A data center can include one or more server computers. The one or more server computers can host a hosted service or other data. The data center can communicate with a customer, for example via exchange of traffic with the customer over a network path. A computing device operating outside of the data center can monitor traffic on the network. In some embodiments, the computing device can correspond to a network monitor, which can monitor the network and/or traffic at a monitoring point, along the network path, and/or elsewhere. The computing device can generate monitoring data via a monitoring application executed at the computing device. The monitoring data can include congestion data that indicates congestion at the network and/or a portion thereof, class of service at the network and/or a portion thereof, and/or other conditions at the network and/or a portion thereof.

The computing device can provide the monitoring data to the data center and/or the data center can obtain the monitoring data from the computing device in other ways. The data center also can store the monitoring data for future use, in some embodiments. The data center also can, via execution of a control application, analyze one or more versions or iterations of the monitoring data and one or more thresholds. The control application can determine, based upon the analysis of the monitoring data and/or the thresholds, network conditions between the data center and one or more users such as the customer. Thus, the data center can determine, based upon the analysis, if performance degradation exists on the network, a portion thereof, along the network path, and/or elsewhere. In particular, the data center can determine if a performance threshold such as a congestion threshold or a class of service threshold is met. If the data center determines that the performance threshold is not met, the data center can terminate the analysis or wait for a future iteration of the monitoring data. If the data center determines that the performance threshold is met, the data center can continue the analysis.

The data center can also determine if a time-based threshold such as a cycle threshold or a time threshold is met. Thus, the data center can determine, in the case of a cycle threshold, if a number of satisfactions of the congestion threshold or class of service threshold meets a defined number of cycles specified by the cycle threshold. Alternatively, the data center can determine, in the case of a time threshold, if a number of satisfactions of the congestion threshold or class of service threshold have occurred within a time period defined by the time threshold. If the data center determines that the time threshold or the cycle threshold is not met, the data center can terminate the analysis or wait for a future iteration of the monitoring data. If the data center determines that the cycle threshold or the time threshold is met, the data center can continue the analysis.

The data center can determine if the condition indicated by the monitoring data is extreme or not. As noted above, multiple levels or thresholds can be defined for the congestion, class of service, and/or other condition. As such, the data center can determine if the condition indicated by the monitoring data satisfies a first threshold that may indicate a poor condition and/or a second threshold that may indicate an extremely poor condition. If the data center determines that the first threshold is met but the second threshold is not met, the data center can be configured to adjust execution of the hosted service. If the data center determines that the first threshold is met and the second threshold is also met, the data center can be configured to relocate the hosted service to another location such as other data centers.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1A, aspects of an operating environment 100 for various embodiments of the concepts and technologies disclosed herein for providing and using closed control loops for data centers will be described, according to an illustrative embodiment. The operating environment 100 shown in FIG. 1A includes a computing device 102. The computing device 102 can operate in communication with and/or as part of a communications network ("network") 104.

According to various embodiments, the functionality of the computing device 102 may be provided by one or more server computers, desktop computers, mobile telephones, laptop computers, embedded computing systems, network monitoring devices, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a server computer. It should be understood that this embodiment is illustrative, and should not be construed as being limiting in any way.

The computing device 102 can execute an operating system 106 and one or more application programs such as, for example, a monitoring application 108. The operating system 106 is a computer program for controlling the operation of the computing device 102. The monitoring application 108 can include an executable program configured to execute on top of the operating system 106 to provide various functions.

In particular, the monitoring application 108 can be configured to monitor various devices and/or data streams associated with the network 104, and to generate monitoring data 110 based upon the monitoring. The monitoring data 110 can include data that represents congestion, class of service, and/or other information associated with one or more instances of traffic 112 traversing the network 104 or a portion thereof, and/or occurring in association with one or more devices or entities in communication with the network 104.

The traffic 112 can include, for example, data transfers, application data, streaming data, or the like, that is being transmitted to a customer 114 from one or more data centers such as the data center 116 and/or one or more other data centers 118A-N (hereinafter collectively and/or generically referred to as "other data centers 118"). It should be understood that the data centers 116, 118 can be substantially similar or even identical to one another, and that the word "other" is used to indicate merely that the data center 116 and the data centers 118 are not the same data center. It should be understood that this example is illustrative and therefore should not be construed as being limiting in any way.

In the illustrated embodiment, the traffic 112 is being transmitted from the data center 116 to the customer 114, though this is merely an example embodiment that should not be construed as being limiting in any way. In particular, the traffic 112 can be associated with multiple data centers such as the data centers 116, 118 shown in FIGS. 1A-1B and/or other applications, services, and/or data centers. Thus, while the traffic 112 shown in FIG. 1A is illustrated as being associated with the data center 116, it should be understood that this is not necessarily the case. In some embodiments, for example, the monitoring data 110 can be generic to a particular network 104, a region of the network 104, one or more communication paths associated with the network 104, and/or other portions of networks.

For purposes of illustrating and describing the concepts and technologies described herein, the embodiment shown in FIG. 1A shows the traffic 112 being associated with the data center 116 and the customer 114. In some embodiments, the computing device 102 can monitor the traffic 112 at a monitoring point 120 and/or other location within the network 104. Because monitoring network traffic such as the traffic 112 is generally understood, the monitoring of the traffic 112 and the monitoring point 120 at which the traffic 112 is monitored will not be further described herein with reference to FIG. 1A.

As briefly mentioned above, the monitoring data 110 can include congestion data, class of service data, and/or other data or information. The congestion data can include data that represents congestion between a data center 116 and a customer 114. In the context of FIG. 1A, the congestion data included in the monitoring data 110 can represent congestion between the data center 116 and the customer 114. It can be appreciated that previously, data centers 116 have generally been unaware of congestion and/or other network conditions outside of the data centers 116.

As such, control of applications and service within the data center 116 typically has been accomplished by network controllers, or the like. Thus, the concepts and technologies described herein enable providing the monitoring data 110 to the data centers 116 and moving application and/or service decisions (e.g., where to host the services or applications; adjusting services or applications using scaling, redundancy, selecting network paths, or the like; and other decisions) to the data centers 116. Additional details on how these decisions can be made within the data centers 116 are illustrated and described in FIGS. 1A-3 and described in more detail below with reference to those FIGURES.

The congestion data can represent congestion in a network 104, in some embodiments. In some other embodiments, the congestion data can represent congestion in a portion, region, or area of a network 104. In yet other embodiments, the congestion data can represent congestion along a network or communication path ("network path") 122 between a data center 116 hosting an application or service and the customer 114. In yet other embodiments, the congestion data can represent congestion at a particular location in the network 104 and/or along the network path 122 at which traffic can be monitored ("monitoring point") 120. It can be appreciated that even if the congestion data represents congestion along the network path 122, the congestion can be measured at the monitoring point 120 or at other locations. It should be understood that this example is illustrative and therefore should not be construed as being limiting in any way.

The congestion data can be formatted in any desired format and/or can represent congestion in any desired units. Thus, the congestion data can indicate, for example, latency at or along one or more network paths 122; perceived or actual delay of packets, signals, or the like; performance metrics associated with an application or service hosted at the data centers 116 as measured from the viewpoint of the customer 114 or at a monitoring point 120; combinations thereof; or the like. Thus, the congestion data can represent network congestion that may be detected by the customer 114 when accessing data, applications, and/or other services at the data centers 116. The congestion data can be obtained for a region of a network 104 and/or for various network paths 122 to enable decisions to be made regarding movement and/or scaling of services or applications based upon congestion between multiple data centers 116 and respective customers 114. It should be understood that this example is illustrative and therefore should not be construed as being limiting in any way.

As noted above, the monitoring data 110 also can include class of service data. The class of service data (labeled in FIG. 1A as "COS data"). The class of service data can represent an actual or perceived class of service associated with the network path 122 and/or perceived by the customer 114 when accessing data, applications, and/or other services hosted at the data centers 116, 118. As discussed above with reference to the congestion data, the class of service data can be expressed in any desired units or formats. The class of service can be defined by network operators, application developers or vendors, customers such as the customer 114, other entities, combinations thereof, or the like. Thus, class of service can be measured to determine if the application or other service is being provided at an agreed-upon or otherwise appropriate level of service (or perceived level of service). Various metrics can be used to measure class of service, and those familiar with the networking arts will realize that of numerous embodiments of such metrics are contemplated and are possible. As such, various class of service and/or quality of service metrics can be measured and represented by the class of service data illustrated and described herein.

The other data or information can include other information that is or may be relevant to a connection or path, such as the network path 122, between the data centers 116 and the customer 114, and/or other portions of the network 104. The other data or information can be used to detect events or conditions that may affect the quality of service and/or perceived quality of service of an application or other service provided by the data centers 116, 118, events that may affect congestion, location information, combinations thereof, or the like. In some embodiments, the other data or information can represent network traffic histories, network maintenance information, planned outages or maintenance, vendor information, firmware updates, software updates, hardware updates, combinations thereof, or the like.

The monitoring data 110 can be provided to one or more of the data centers 116, 118. The data centers 116, 118 can include one or more server computers or other computing devices. According to various embodiments, the data centers 116, 118 can include a server farm or other collection of server computers. The data centers 116, 118 can host one or more applications, modules, services, or other computer-executable instructions for providing functionality to users, devices, networks, or the like.

As shown in FIG. 1A, each of the data centers 116, 118 can host a control application 124. Although the control application 124 is illustrated as a component of the data centers 116, 118, it should be understood that the control application 124 may be embodied as or in stand-alone devices or components thereof operating as part of or in communication with the data centers 116 and/or a computing device associated with the data centers 116, 118. As such, the illustrated embodiment should be understood as being illustrative of only some contemplated embodiments and should not be construed as being limiting in any way.

The control application 124 can obtain the monitoring data 110, analyze the monitoring data 110, and determine if execution of an application, module, service, or other data ("hosted service") 126 should be adjusted or otherwise changed based upon the monitoring data 110. Although the data hosted by the data center 116 is illustrated and described herein as a "hosted service 126," it should be understood that the hosted "service" can correspond to data that is delivered by the data center 116 such as, for example, files, streaming data, applications, audio, video, or the like. As such, the phrase "hosted service" should be understood as referring to various types of data and/or computer-executable instructions that can be hosted or stored at the data centers 116, 118 and/or provided to one or more recipients such as the customer 114.

According to various embodiments, the control application 124 can analyze the monitoring data 110 and determine, based upon the monitoring data 110 and/or known or expected network conditions, whether or not the hosted service 126 should be adjusted, moved, or otherwise changed to address a performance issue, perceived class of service, congestion, and/or other concerns. Because the control application 124 can take additional and/or alternative actions based upon the analysis of the monitoring data 110, it should be understood that these examples are illustrative and therefore should not be construed as being limiting in any way.

According to various embodiments of the concepts and technologies described herein, the hosted service 126 can be hosted within the data center 116 by one or more computing or storage resources 128A. Similarly, the data center 118A can host or include resources 128B, and the data center 118N can host or include resources 128N. For purposes of simplifying the description of the concepts and technologies described herein, the resources 128A, 128B, and 128N are generally hereinafter referred to generically and/or collectively as resources 128.

According to various embodiments of the concepts and technologies described herein, the control application 124 can analyze the monitoring data 110 and/or other information to determine whether the hosted service 126 should be moved to new resources 128 within an associated data center such as the data center 116, if other resources 128 should be dedicated to execution of the hosted service 126, if new or altered network paths should be identified for transmission of data associated with the hosted service 126, or whether the hosted service 126 should be moved to another data center such as one of the data centers 118.

It can be appreciated that a closed control loop can be created for one or more data centers 116, 118 by way of using embodiments of the concepts and technologies described herein. In particular, the data centers 116, 118 can obtain monitoring data 110, and control execution of the hosted service 126 and/or relocation of the hosted service 126 without receiving instructions from other devices. Thus, the data centers 116, 118 can, via execution of the control application 124 and/or analysis of the monitoring data 110 illustrated and described herein, autonomously control execution and/or relocation of the hosted service 126. Thus, a "closed control loop," as used herein, can refer to a data center 116, 118 moving, adjusting, relocating, or otherwise completing operations to adjust execution of the hosted service 126 and/or delivery or transmission of data associated with the hosted service 126 without receiving instructions from controllers, hypervisors, and/or other devices, systems, or nodes. It should be understood that this example is illustrative and therefore should not be construed as being limiting in any way.

In some embodiments, the monitoring data 110 can be stored in a data storage device or data storage location associated with the data center 116 (e.g., in virtual storage resources or real virtual resources such as hard disk drives, servers, or the like). In some other embodiments, the monitoring data 110 can be stored at a data storage device or data storage location that can be remote from the data center 116 such as, for example, one or more real or virtual data storage locations such as, for example, a memory, a server computer, a database, a hard disk drive, a flash drive, a data store, or the like. In the illustrated embodiment shown in FIG. 1A, the data center 116 can be configured to store the monitoring data 110 at a data store 130. The data store 130 can be hosted by a server computer at the data center 116 and/or elsewhere. According to various embodiments, the functionality of the data store 130 can be provided by one or more server computers, databases, laptop computers, memory devices, hard drives or other mass storage devices, virtual storage resources, combinations thereof, or the like.

The data store 130 also can be configured to store one or more thresholds 132. The thresholds 132 can define multiple thresholds that can be used by the control application 124 to perform the functionality illustrated and described herein. In particular, as will be more clearly understood with reference to FIG. 2, the thresholds 132 can include one or more congestion thresholds, one or more class of service thresholds, one or more time thresholds, one or more cycle thresholds, and/or one or more other thresholds. As used herein, a "time-based threshold" can be used to refer to either or both of the cycle threshold or the time threshold as illustrated and described herein.

The congestion thresholds can define or specify one or more congestion levels. In particular, the congestion thresholds can define threshold levels for congestion that, if met, can be determined to indicate excellent congestion levels, good congestion levels, acceptable congestion levels, unacceptable congestion levels, poor congestion levels, extremely poor congestion levels, or the like. It should be understood that any number of congestion threshold levels can be defined and corresponding conditions can be defined for the multiple thresholds. Thus, the above indications of good, excellent, etc. are example embodiments and should not be construed as being limiting in any way.

Similarly, the class of service thresholds can define threshold levels for class of service that, if met, can be determined to indicate excellent class of service levels, good class of service levels, acceptable class of service levels, unacceptable class of service levels, poor class of service levels, extremely poor class of service levels, or the like. The above indications of good, excellent, etc. are example embodiments and should not be construed as being limiting in any way. It should be understood that any number of class of service threshold levels can be defined and corresponding conditions can be defined for the multiple thresholds.

The time thresholds can define one or more time parameters that, if met, can trigger satisfaction of thresholds and/or can override satisfaction of thresholds. For example, as will be explained in more detail below, particular with reference to FIG. 2, a class or service or congestion threshold may indicate extremely poor conditions or levels of congestion or class of service. The time thresholds can be defined to indicate that action will not be taken with respect to these thresholds, however, until multiple conditions are detected within a time period defined by the time thresholds. In some embodiments, the time threshold defines a time period during which two or more violations of performance thresholds (congestion thresholds and/or class of service thresholds) must occur before any action will be taken. It should be understood that this example is illustrative and therefore should not be construed as being limiting in any way.

Similarly, the cycle thresholds can define a number of cycles that, if met, can trigger satisfaction of thresholds and/or can override satisfaction of thresholds. For example, as will be explained in more detail below, in particular with reference to FIG. 2, a congestion threshold may indicate a poor condition or level of congestion. The cycle threshold can be defined to indicate that action will not be taken with respect to this threshold until multiple such conditions (satisfaction of the threshold) are detected. It should be understood that this example is illustrative and therefore should not be construed as being limiting in any way.

In various embodiments of the concepts and technologies described herein, the data store 130 and/or the data center 116 can store the thresholds 132, the data center 116 can store the thresholds 132, and/or the thresholds 132 can be defined by the control application 124 and therefore may be considered as part of the control application 124. In the illustrated embodiment, a server computer that hosts the data store 130 can store the thresholds 132. In this embodiment, the server computer that hosts the data store 130 also can be configured to expose an application programming interface ("API") 134 that can be used to modify and/or otherwise program the thresholds 132. Thus, the thresholds 132 may or may not be static, in some embodiments. It should be understood that this example is illustrative and therefore should not be construed as being limiting in any way.

In practice, the data center 116 can host the application, data, module, service or other embodiment of the hosted service 126. The data center 116 can communicate with a customer 114, for example via exchange of traffic 112 with the customer 114 over a network path 122. The computing device 102 can monitor the traffic 112, e.g., at a monitoring point 120 and/or elsewhere, and generate monitoring data 110 via a monitoring application 108 executed at the computing device 102. The monitoring data 110 can include congestion data that can indicate congestion at the network 104 and/or a portion thereof; class of service at the network 104 and/or a portion thereof and/or other conditions at the network 104 and/or a portion thereof.

The computing device 102 can provide the monitoring data 110 to the data center 116 and/or the data center 116 can obtain the monitoring data 110 from the computing device 102 in other ways. The data center 116 can store the monitoring data 110. The data center 116 also can, via execution of a control application 124, analyze one or more versions or iterations of the monitoring data 110 and one or more thresholds 132. The control application 124 can determine, based upon the analysis of the monitoring data 110 and/or the thresholds 132, network conditions between the data center 116 and one or more users such as the customer 114. Thus, the data center 116 can determine, based upon the analysis, an actual or perceived class of service for the hosted service 126, congestion between the data center 116 and the customer 114, and/or other performance metrics associated with the network 104 and/or a portion thereof. It should be understood that this example is illustrative and therefore should not be construed as being limiting in any way.

In some embodiments, the data center 116 can determine, based upon the analysis, if a performance threshold such as a congestion threshold or a class of service threshold included in the thresholds 132, is met. If the data center 116 determines that the performance threshold is not met, the data center 116 can terminate the analysis or wait for a future iteration of the monitoring data 110, in some embodiments, though this is not necessarily the case. If the data center 116 determines that the performance threshold is met, the data center 116 can continue the analysis. It should be understood that this example is illustrative and therefore should not be construed as being limiting in any way.

The data center 116 can determine if a time-based threshold such as a cycle threshold or a time threshold is met. Thus, the data center 116 can determine, in the case of a cycle threshold, if a number of satisfactions of the congestion threshold or class of service threshold meets a defined number of cycles specified by the cycle threshold. Alternatively, the data center 116 can determine, in the case of a time threshold, if a number of satisfactions of the congestion threshold or class of service threshold have occurred within a time period defined by the time threshold. If the data center 116 determines that the time or cycle threshold is not met, the data center 116 can terminate the analysis or wait for a future iteration of the monitoring data 110, in some embodiments, though this is not necessarily the case. If the data center 116 determines that the cycle or time threshold is met, the data center 116 can continue the analysis. It should be understood that this example is illustrative and therefore should not be construed as being limiting in any way.

In some embodiments, if the performance threshold and the time-based threshold are met, the data center 116 can again consider the congestion, class of service, or other condition indicated by the monitoring data 110. The data center 116 can determine if the condition indicated by the monitoring data 110 is extreme or not. As noted above, multiple levels or thresholds can be defined for the congestion, class of service, and/or other condition. As such, the data center 116 can determine if the condition indicated by the monitoring data 110 satisfies a first threshold that may indicate a poor condition and/or a second threshold that may indicate an extremely poor condition.

If the data center 116 determines that the first threshold is met but the second threshold is not met, the data center 116 can be configured to adjust execution of the hosted service 126. For example, the data center 116 can provide additional resources 128 at the data center 116 to improve performance, take other actions, or the like. Because other adjustments of the hosted service 126 can be made by the data center 116, it should be understood that this example is illustrative and therefore should not be construed as being limiting in any way. If the data center 116 determines that the first threshold is met and the second threshold is also met, the data center 116 can be configured to relocate the hosted service 126 to another location such as the data centers 118. Because other adjustments of the hosted service 126 can be made by the data center 116, it should be understood that this example is illustrative and therefore should not be construed as being limiting in any way.

Figure 1B:
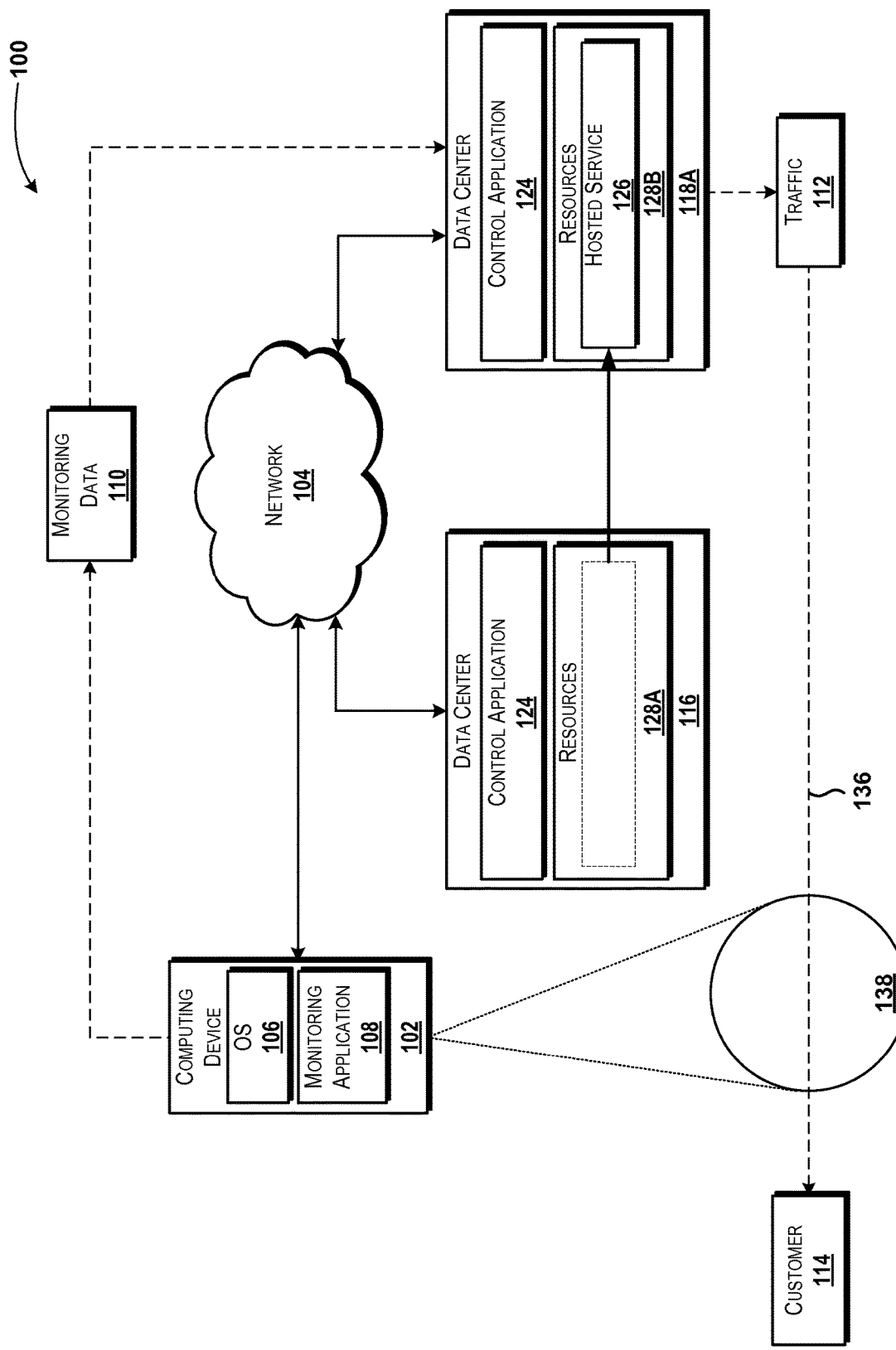

As shown in FIG. 1B, the data center 116 can be configured, in some embodiments, to relocate the hosted service 126 from the data center 116 to one of the other data centers 118 such as the data center 118A in response to detecting an extreme condition. After relocating the hosted service 126 to the data center 118A, the data center 116 can terminate the hosted service 126 at the data center 116. Upon relocation to the data center 118A, the hosted service 126 can create new traffic 112 with the customer 114. This traffic and the new network path 136 can be monitored by the computing device 102, and monitoring data 110 can be provided to the data center 118A. The monitoring can occur in any way, including monitoring at a new monitoring point 138 as shown in FIG. 1B. It should be understood that this example is illustrative and therefore should not be construed as being limiting in any way.

FIGS. 1A-1B illustrates one computing device 102, one network 104, one customer 114, three data centers 116, 118, one monitoring point 120, one network path 122, one hosted service 126, one new network path 136, and one new monitoring point 138. It should be understood, however, that various implementations of the operating environment 100 can include zero, one, or more than one computing device 102; zero, one, or more than one network 104; zero, one, or more than one customer 114; zero, one, two, three, or more than three data centers 116, 118; zero, one, or more than one monitoring point 120; zero, one, or more than one network path 122; zero, one, or more than one hosted service 126; zero, one, or more than one new network path 136; and/or zero, one, or more than one new monitoring point 138. As such, the illustrated embodiment should be understood as being illustrative, and should not be construed as being limiting in any way.

Figure 2:
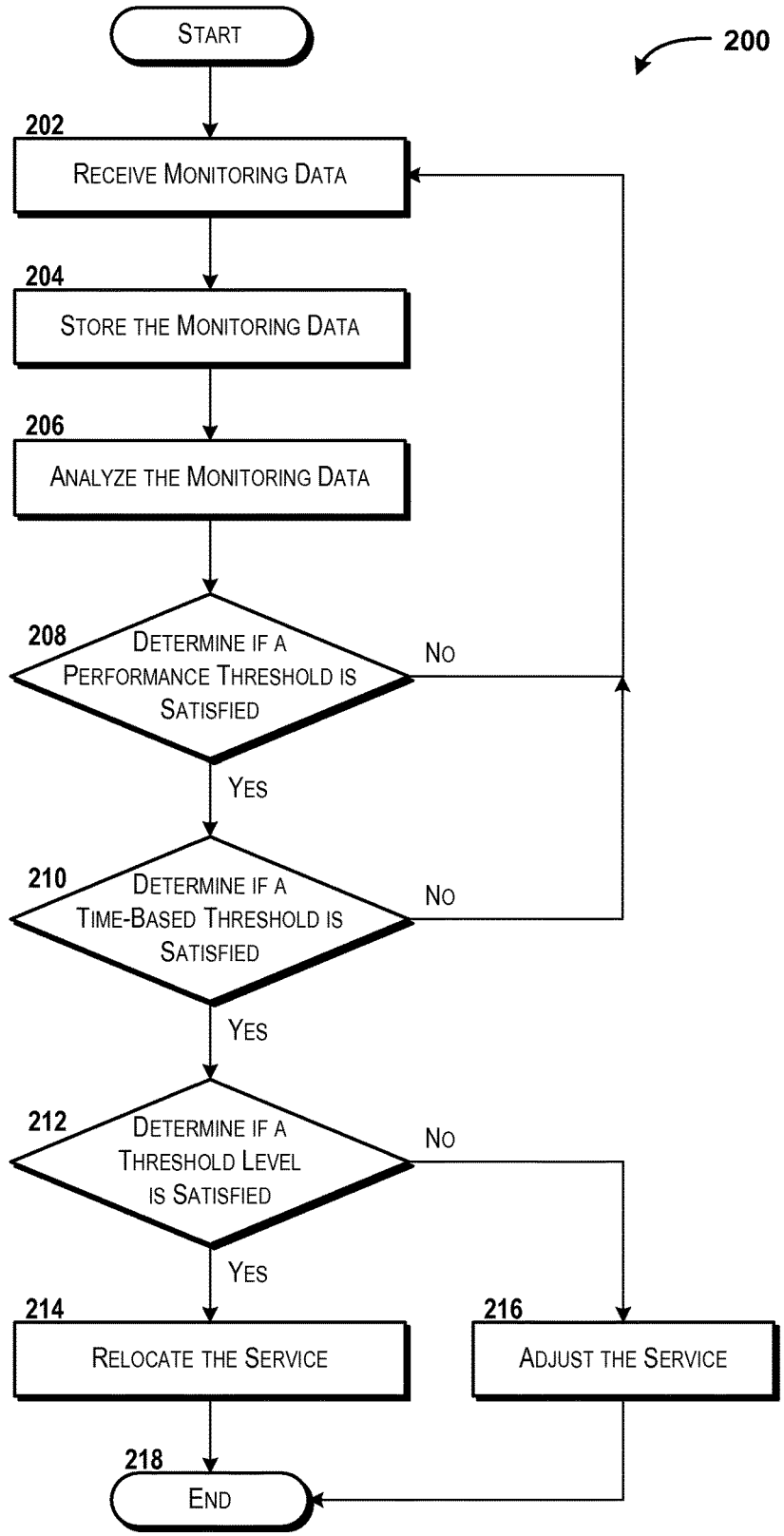
FIG. 2 is a flow diagram showing aspects of a method for controlling a hosted service based on analyzing monitoring data, according to an illustrative embodiment of the concepts and technologies described herein.

Turning now to FIG. 2, aspects of a method 200 for controlling a hosted service 126 based on analyzing monitoring data 110 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as a computing device associated with one or more of the data centers 116, 118 to perform one or more operations and/or causing the processor to direct other components of the computing system or device to perform one or more of the operations.

For purposes of illustrating and describing the concepts of the present disclosure, the methods disclosed herein are described as being performed by the data center 116 via execution of one or more software modules such as, for example, the control application 124. It should be understood that the data center 116 can include at least one computing device such as a computer, a server computer, or the like, that can host the control application 124. As such, the data center 116 can include at least one processor and at least one memory that can cooperate to provide the functionality described herein.

Figure 4:
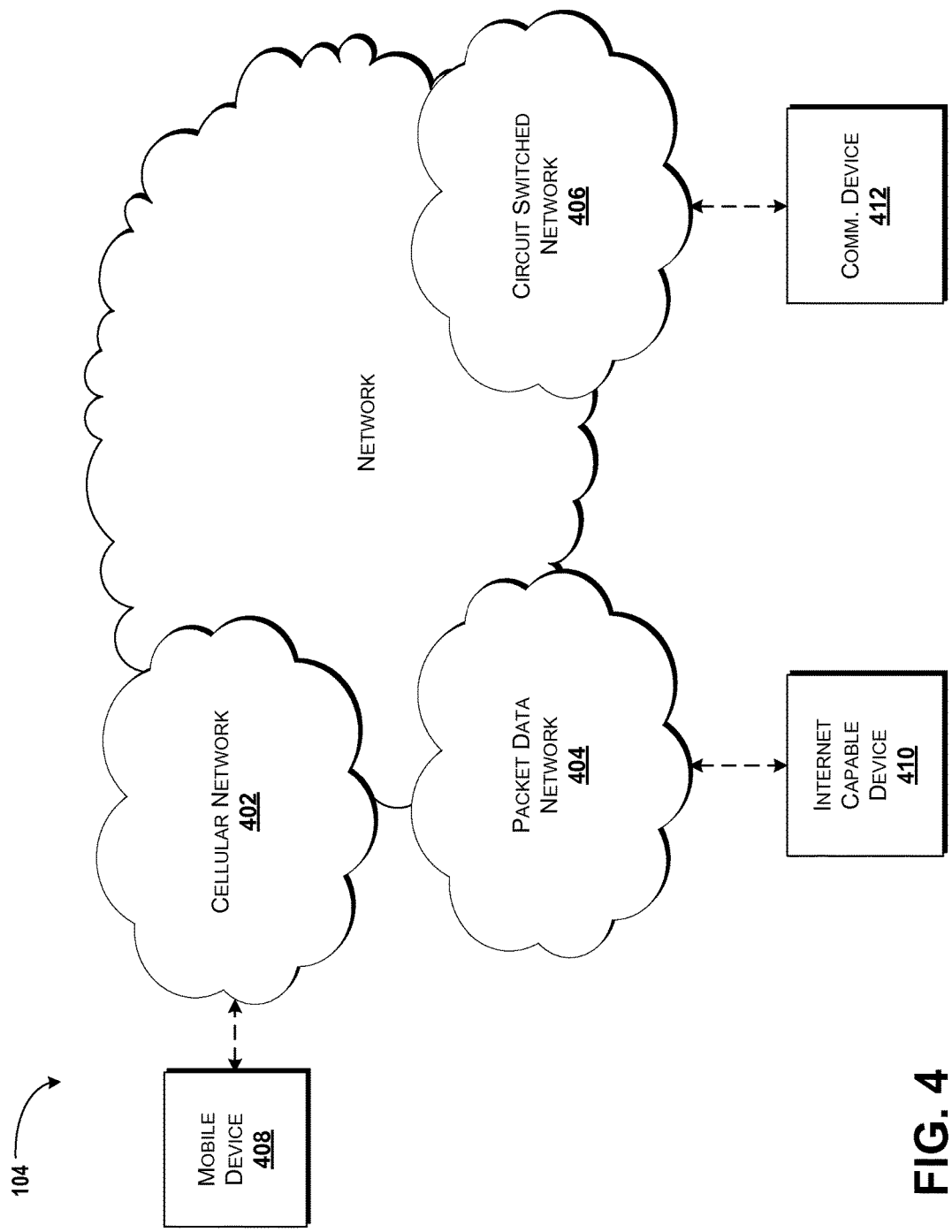
FIG. 4 schematically illustrates a network, according to an illustrative embodiment of the concepts and technologies described herein.

In some embodiments, the computing device associated with the data center 116 can have an architecture similar (or even identical) to the computer architecture illustrated and described herein with reference to FIG. 4. It should be understood that this embodiment is illustrative and therefore should not be construed as being limiting in any way. Furthermore, it should be understood that additional and/or alternative devices and/or network nodes can provide the functionality described herein via execution of one or more modules, applications, and/or other software including, but not limited to, the control application 124. Thus, the illustrated embodiments are illustrative, and should not be viewed as being limiting in any way.

The method 200 begins at operation 202. At operation 202, the data center 116 can receive the monitoring data 110. As explained above with reference to FIGS. 1A-1B, the monitoring data 110 can include congestion data, class of service data, and/or other information or data that can relate to a network 104 and/or one or more network paths 122 between one or more of the data centers 116, 118 and one or more customers 114. As noted above, the monitoring data 110 can relate to the network 104 in general, to an area or portion of the network 104, to a particular network path 122 between one or more of the data centers 116, 118 and a customer 114, combinations thereof, or the like.

According to some embodiments, the monitoring data 110 can be received at the data center 116 in response to a request, by the data center 116, for the monitoring data 110. In some other embodiments, the monitoring data 110 can be received at the data center 116 without any request, for example by the computing device 102 submitting the monitoring data 110 to the data center 116. Because the monitoring data 110 can be obtained at the data center 116 in a variety of manners, it should be understood that these examples are illustrative and therefore should not be construed as being limiting in any way.

From operation 202, the method 200 proceeds to operation 204. At operation 204, the data center 116 can store the monitoring data 110. The monitoring data 110 can be stored, in some embodiments, at the data center 116. In some other embodiments, the monitoring data 110 can be stored in a data storage device or location that can be remote from the data center 116 such as, for example, the data store 130 shown in FIG. 1A. The monitoring data 110 can be stored, in some embodiments, for analysis and/or later use to determine if the hosted service 126 should be adjusted, moved, relocated, or otherwise changed in response to network conditions represented by the monitoring data 110. Because the monitoring data 110 can be used without storage in some embodiments, and because the monitoring data 110 can be stored for additional and/or alternative reasons, it should be understood that this example is illustrative and therefore should not be construed as being limiting in any way.

From operation 204, the method 200 proceeds to operation 206. At operation 206, the data center 116 can analyze the monitoring data 110. In some embodiments, one or more iterations of the monitoring data 110 can be analyzed in operation 206. Thus, as can be appreciated with reference to FIG. 2, the monitoring data 110 received in operation 202 can be stored by the data center 116 alone or with multiple iterations of the monitoring data 110. In some embodiments, the monitoring data 110 stored by the data center 116 can include multiple iterations of the monitoring data 110 received from the computing device 102.

Thus, while the monitoring data 110 stored by the data center 116 and/or at the data store 130 is illustrated in FIGS. 1A-1B as having a reference numeral 110, which is the same as the reference numeral assigned to the monitoring data 110 received from the computing device 102, it should be understood that the monitoring data 110 stored by the data center 116 and/or the data store 130 may include multiple iterations of the monitoring data 110 generated by the computing device 102. It should be understood that this example is illustrative and therefore should not be construed as being limiting in any way.

From operation 206, the method 200 proceeds to operation 208. At operation 208, the data center 116 can determine, based upon the analysis illustrated in operation 208, if a performance threshold is satisfied. According to various embodiments, the data center 116 can determine, in operation 208, if a congestion threshold and/or a class of service threshold is satisfied. As explained above, the data center 116 can be configured to analyze one or more thresholds 132. For a particular type of threshold 132 such as, for example, the congestion threshold and/or the class of service threshold, the data center 116 can be configured to evaluate one or more threshold levels. As such, operation 208 can correspond to the data center 116 determining if any threshold 132 stored and/or accessible to the data center 116 is satisfied by the monitoring data 110 analyzed in operation 206.

Figure 3:
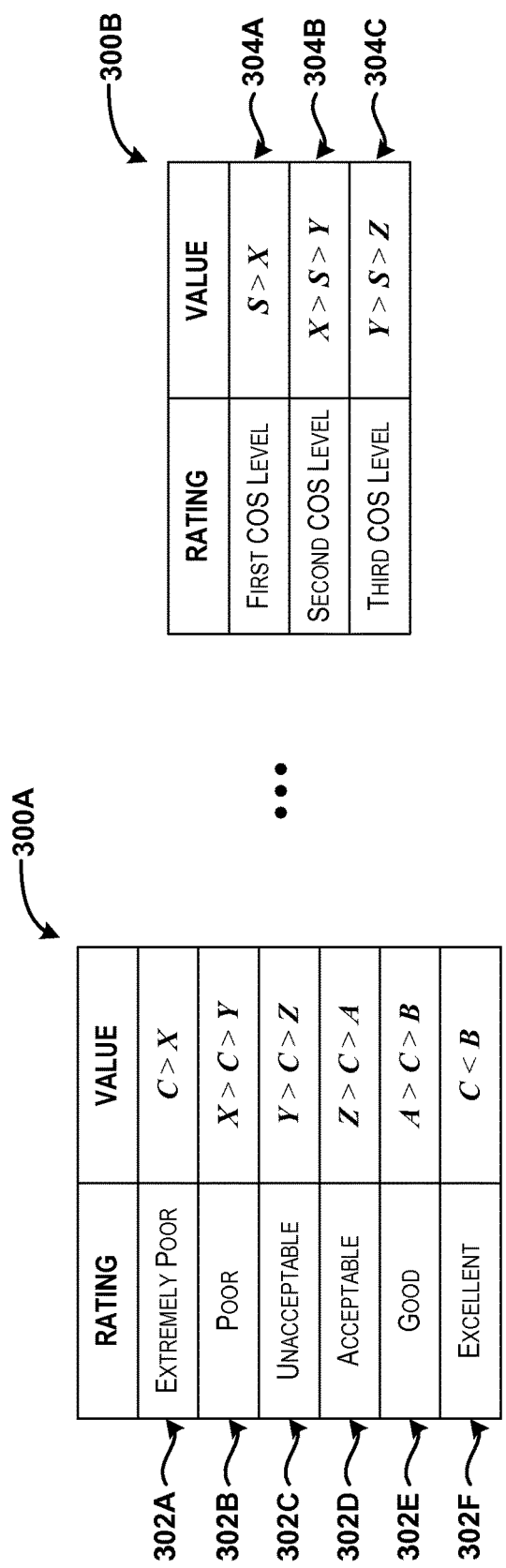
FIG. 3 is a line diagram that schematically illustrates two example thresholds for use in evaluating monitoring data, according to an illustrative embodiment of the concepts and technologies described herein.

To illustrate the concepts and technologies described herein, two example thresholds 132 are shown in FIG. 3. The thresholds 132 shown in FIG. 3 include a congestion threshold 300A and a class of service threshold 300B. With reference to the congestion threshold 300A, a congestion level C can be indicated by the congestion data included in the monitoring data 110 as illustrated and described above. The congestion threshold 300A can include data representing one or more thresholds. In the illustrated embodiment, the congestion threshold 300A can include six threshold values. This example is illustrative of one contemplated embodiment and therefore should not be construed as being limiting in any way.

In the illustrated embodiment, the congestion threshold 300A includes a first threshold level 302A, which can indicate an extremely poor congestion level. In the illustrated embodiment, a congestion level C that is greater than a first congestion threshold level X can be interpreted as indicating extremely poor congestion in the network 104 and/or a portion thereof. It should be understood that this example is illustrative and therefore should not be construed as being limiting in any way.

The congestion threshold 300A can include a second threshold level 302B, which can specify that a congestion level C that is greater than a second congestion threshold level Y but less than X can be interpreted as indicating poor congestion in the network 104 and/or a portion thereof. The congestion threshold 300A can include a third threshold level 302C, which can specify that a congestion level C that is greater than a third congestion threshold level Z but less than Y can be interpreted as indicating unacceptable congestion in the network 104 and/or a portion thereof. The congestion threshold 300A can include a fourth threshold level 302D, which can specify that a congestion level C that is less than Z but greater than a fourth congestion threshold level A can be interpreted as indicating acceptable congestion in the network 104 and/or a portion thereof.

The congestion threshold 300A can include a fifth threshold level 302E, which can specify that a congestion level C that is less than A but greater than a fifth congestion threshold level B can be interpreted as indicating a good level of congestion in the network 104 and/or a portion thereof. The congestion threshold 300A can include a sixth threshold level 302F, which can specify that a congestion level C that is less than B can be interpreted as indicating an excellent level of congestion in the network 104 and/or a portion thereof. Because the thresholds 132 and/or associated threshold levels can be defined in various ways, it should be understood that these examples are illustrative and therefore should not be construed as being limiting in any way.

With reference to the class of service threshold 300B, a class of service level S can be indicated by the class of service data included in the monitoring data 110 as illustrated and described above. The class of service threshold 300B can also include data representing one or more thresholds. In the illustrated embodiment, the class of service threshold 300B can include three threshold values. This example is illustrative of one contemplated embodiment and therefore should not be construed as being limiting in any way.

In the illustrated embodiment, the class of service threshold 300B includes a first threshold level 304A, which can indicate a first class of service level; a second threshold level 304B, which can indicate a second class of service level; and a third threshold level 304C, which can indicate a third class of service level. In the illustrated embodiment, a class of service level S that is greater than a first class of service threshold level D can be interpreted as indicating a top class of service level in the network 104 and/or a portion thereof; a class of service level S that is greater than a second class of service threshold level E (but less than D) can be interpreted as indicating a second class of service level in the network 104 and/or a portion thereof; and a class of service level S that is below a second class of service threshold level E can be interpreted as indicating a third class of service level in the network 104 and/or a portion thereof. It should be understood that this example is illustrative and therefore should not be construed as being limiting in any way.

Thus, the data center 116 can determine, in operation 208, if any of one or more threshold levels associated with a performance threshold such as the thresholds 132 is satisfied. If the data center 116 determines, in operation 208, that a performance threshold is not satisfied, the method 200 can return to operation 202. The operations 202-208 can be iterated until the data center 116 determines, in any iteration of operation 208, that the performance threshold is satisfied. If the data center 116 determines, in operation 208, that the performance threshold is satisfied, the method 200 can proceed to operation 210.

At operation 210, the data center 116 can determine if a time-based threshold is satisfied. Thus, the data center 116 can determine, in operation 210, if a cycle threshold and/or a time threshold is satisfied. According to various embodiments of the concepts and technologies described herein, a cycle threshold and/or a time threshold can be used to normalize the analysis described herein. Thus, a single spike in congestion or a single dip in class of service may be ignored by the data center 116. Thus, the concepts and technologies described herein can include using a cycle threshold that can be applied if a performance threshold is met to determine if the performance threshold has been met a number of times. Similarly, a time threshold can be applied if the performance threshold is met to determine if the performance threshold has been met a number of times during a specified time period.

Thus, for example, the cycle threshold can specify a number such as two, three, five, ten, or the like, and conditions that satisfy a performance threshold can be ignored if the number of cycles during which the performance threshold is met does not meet the threshold. Similarly, the time threshold can specify a time period such as one day, one hour, one minute, one second, or the like, and conditions that satisfy a performance threshold can be ignored if the time period during which the performance threshold is met two or more times does not meet the specified time threshold. It should be understood that the data center 116 can apply both a cycle threshold and a time threshold, in some embodiments, and that the data center 116 can be configured to omit operation 210 in some other embodiments. It also should be understood that the above threshold examples are illustrative and therefore should not be construed as being limiting in any way.

If the data center 116 determines, in operation 210, that a time-based threshold is not satisfied, the method 200 can return to operation 202. The operations 202-210 can be iterated until the data center 116 determines, in any iteration of operation 210, that the time-based threshold is satisfied. If the data center 116 determines, in operation 210, that the time-based threshold is satisfied, the method 200 can proceed to operation 212.

At operation 212, the data center 116 can determine if a particular threshold level is satisfied. As explained above, a threshold 132 can include multiple levels, grades, or the like. Thus, the data center 116 can determine, in operation 212, if a particular level or grade is met. In various embodiments, the data center 116 can determine, in operation 212, if an extreme case of congestion, class of service, or other performance degradation has occurred. Thus, in various embodiments, the data center 116 can determine, in operation 212, if a top level or bottom level of a performance threshold has been satisfied. The data center 116 can undertake the analysis depicted in operation 212 to grade satisfaction of the thresholds 132 as being extreme or non-extreme cases, among other determinations. Because the determination in operation 212 can be completed for other reasons, it should be understood that this example is illustrative and therefore should not be construed as being limiting in any way.

If the data center 116 determines, in operation 212, that the threshold level is satisfied, the data center 116 can determine that the performance degradation detected in operation 206 is an extreme case, and the method 200 can proceed to operation 214. At operation 214, the data center 116 can relocate the service such as the hosted service 126. Because the data center 116 can determine that the performance degradation detected in operation 206 is an extreme case, the data center 116 can determine that the hosted service 126 should be moved to a different data center such as the data centers 118 shown in FIG. 1A. It should be understood that this example is illustrative and therefore should not be construed as being limiting in any way.

The data center 116 can determine a target data center based upon various considerations. In some embodiments, the data center 116 can analyze the monitoring data 110 and determine, based upon the monitoring data 110, an area of the network 104 that is not congested and/or has not experienced degradation in class of service. In other embodiments, the data center 116 can maintain a list of target data centers and can communicate with the target data centers to identify an ideal target. The target data centers can also receive monitoring data 110 and/or execute a control application 124, and as such the target data centers can be configured to communicate with the data center 116 to identify a data center that is expected to experience the least congestion and/or degradation in class of service. Because the ideal target or candidate data center can be identified in additional and/or alternative ways, it should be understood that this example is illustrative and therefore should not be construed as being limiting in any way.

If the data center 116 determines, in operation 212, that the threshold level is not satisfied, the data center 116 can determine that the performance degradation detected by analysis of the monitoring data 110 in operation 206 is not an extreme case, and the method 200 can proceed to operation 216. At operation 216, the data center 116 can adjust the service such as the hosted service 126. In operation 216, the data center 116 can adjust the service to improve performance of the hosted service 126 without relocating the hosted service 126 to a different data center.

Various types of adjustments can be made by the data center 116 to the hosted service 126. For example, the data center 116 can identify a different network path (instead of the network path 122) between the data center 116 and the customer 114 to avoid congestion and/or to identify a network path having a better class of service; the data center 116 can adjust resources 128 at the data center 116 to improve delivery between the data center 116 and the customer 114; the data center 116 can create redundant servers or virtual machines; combinations thereof; or the like. Because other adjustments can be made at the data center 116 to improve performance of the hosted service 126, it should be understood that these examples are illustrative and therefore should not be construed as being limiting in any way.

From operation 216, the method 200 proceeds to operation 218. The method 200 also can proceed to operation 218 from operation 214. The method 200 can end at operation 218.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 4G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
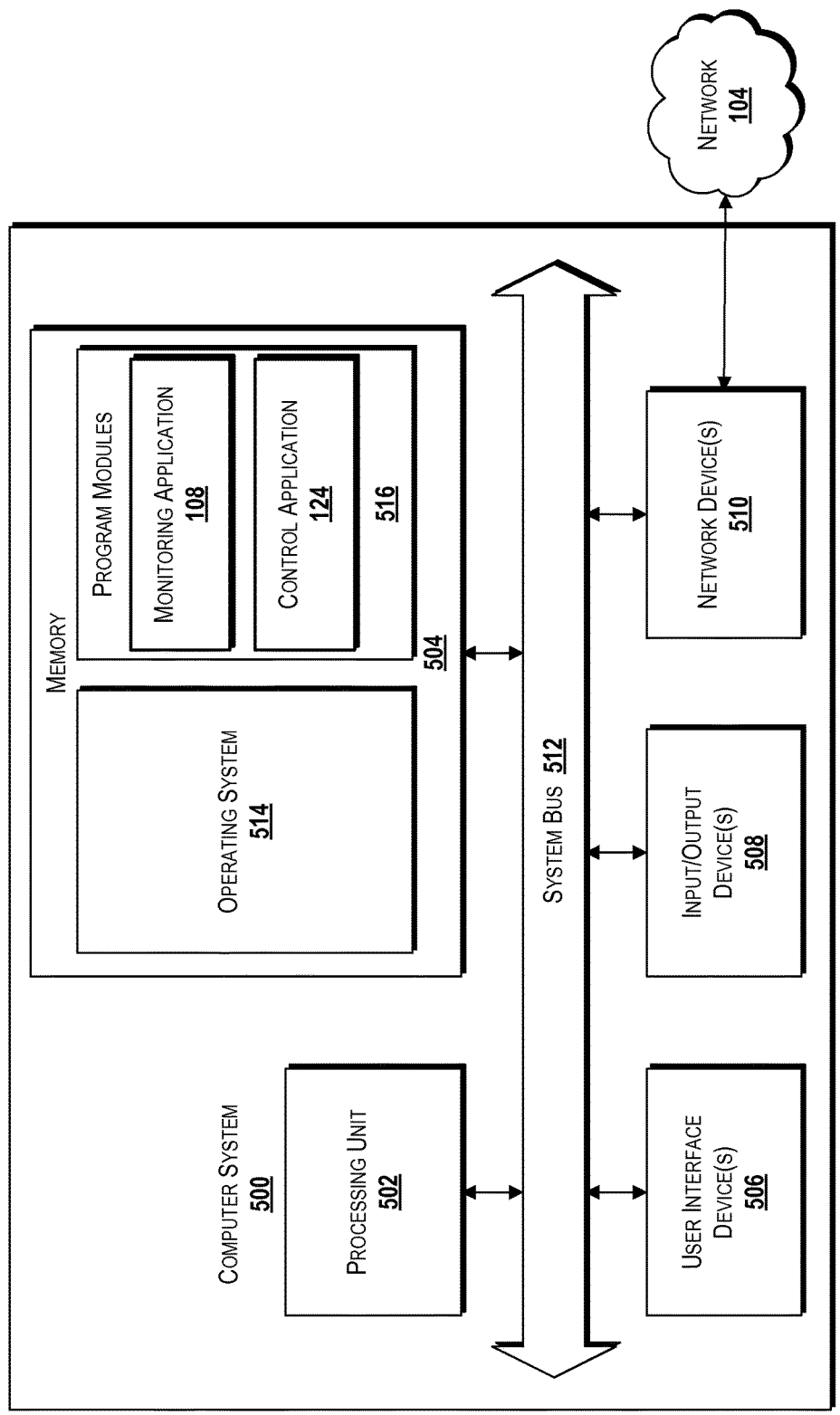
FIG. 5 is a block diagram illustrating an example computer system configured to provide and use a closed control loop for data centers, according to some illustrative embodiments of the concepts and technologies described herein.

FIG. 5 is a block diagram illustrating a computer system 500 configured to provide the functionality described herein for providing and using a closed control loop for data centers, in accordance with various embodiments of the concepts and technologies disclosed herein. It can be appreciated that a device that hosts the control application 124 illustrated and described herein, such as, for example, a device located at the data centers 116, 118, as well as the computing device 102 can have an architecture similar to the computer system 500 illustrated and described herein. It should be understood that these examples are illustrative and therefore should not be construed as being limiting in any way.

The computer system 500 can include a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the monitoring application 108 and/or the control application 124. This and/or other programs can be embodied in computer-readable media containing instructions that, when executed by the processing unit 502, perform one or more of the method 200 described in detail above with respect to FIG. 2. According to embodiments, the program modules 516 may be embodied in hardware, software, firmware, or any combination thereof. Although not shown in FIG. 5, it should be understood that the memory 504 also can be configured to store the monitoring data 110, the traffic 112, the hosted service 126, the resources 128, the data store 130, the thresholds 132, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing and using a closed control loop for data centers have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
receiving, at a data center comprising a processor that executes a control application, monitoring data, wherein the monitoring data comprises congestion data and class of service data, wherein the processor is located at the data center, wherein the data center further comprises resources that host a hosted service, wherein the monitoring data is received from a computing device that operates outside of the data center, wherein the monitoring data relates to traffic on a network path between a customer and the hosted service at the data center, wherein the congestion data describes congestion perceived by the customer, and wherein the class of service data describes class of service perceived by the customer;
determining, by the processor and based on analyzing the monitoring data, that a performance degradation exists for the traffic on the network path, wherein determining that the performance degradation exists comprises determining that a performance threshold is satisfied by determining that a congestion threshold is satisfied or determining that a class of service threshold is satisfied;
in response to a determination that the performance threshold is satisfied, determining, by the processor, if the performance threshold has been satisfied a defined number of times specified by a cycle threshold, and wherein a cycle threshold is not satisfied if the performance threshold has not been satisfied the number of times;

if a determination is made that the cycle threshold is not satisfied, ignoring, by the processor, the performance degradation;

in response to determining that the cycle threshold is satisfied, determining, by the processor, if a time threshold is satisfied, wherein the time threshold is satisfied if the performance threshold is satisfied the number of times during a period of time defined by the time threshold, and wherein the time threshold is not satisfied if the performance threshold is not satisfied the number of times during the period of time defined by the time threshold;

if a determination is made that the time threshold is not satisfied, ignoring, by the processor, the performance degradation, whereby the performance degradation is ignored until the performance threshold is satisfied, during the period of time defined by the time threshold, the number of times as defined by the cycle threshold;

in response to a determination that the time threshold is satisfied, determining if a threshold level is satisfied by the monitoring data;

if a determination is made that the threshold level is satisfied, relocating, by the processor, the hosted service to a new data center, wherein the relocating occurs without receiving instructions from an entity outside of the data center; and if a determination is made that the threshold level is not satisfied, adjusting, by the processor, execution of the hosted service without relocating the hosted service to the new data center, wherein the adjusting occurs without receiving instructions from the entity outside of the data center.

2. The method of claim 1, wherein determining that the threshold level is satisfied comprises determining, by the processor, that an extreme performance degradation exists.

3. The method of claim 1, wherein ignoring the performance degradation comprises waiting for a future iteration of the monitoring data.

4. The method of claim 1, wherein ignoring the performance degradation comprises not adjusting execution of the hosted service.

5. The method of claim 1, wherein ignoring the performance degradation comprises terminating analysis of the monitoring data.

6. A system comprising:
a data center comprising a processor; and
a memory that stores computer-executable instructions that, when executed by the processor, cause the processor to perform operations comprising
receiving, at the data center, monitoring data that comprises congestion data and class of service data, wherein the data center further comprises resources that host a hosted service, wherein the monitoring data is received from a computing device that operates outside of the data center, wherein the monitoring data relates to traffic on a network path between a customer and the hosted service at the data center, wherein the congestion data describes congestion perceived by the customer, and wherein the class of service data describes class of service perceived by the customer,
determining, based on analyzing the monitoring data, that a performance degradation exists for the traffic on the network path, wherein determining that the performance degradation exists comprises determining that a performance threshold is satisfied by determining that a congestion threshold is satisfied or determining that a class of service threshold is satisfied,
in response to a determination that the performance threshold is satisfied, determining if the performance threshold has been satisfied a defined number of times specified by a cycle threshold, and wherein the cycle threshold is not satisfied if the performance threshold has not been satisfied the number of times,
if a determination is made that the cycle threshold is not satisfied, ignoring the performance degradation,
in response to determining that the cycle threshold is satisfied, determining if a time threshold is satisfied, wherein the time threshold is satisfied if the performance threshold is satisfied the number of times during a period of time defined by the time threshold, and wherein the time threshold is not satisfied if the performance threshold is not satisfied the number of times during the period of time defined by the time threshold,
if a determination is made that the time threshold is not satisfied, ignoring the performance degradation, whereby the performance degradation is ignored until the performance threshold is satisfied, during the period of time defined by the time threshold, the number of times,
in response to a determination that the time threshold is satisfied, determining if a threshold level is satisfied by the monitoring data,
if a determination is made that the threshold level is satisfied, relocating, by the processor, the hosted service to a new data center, wherein the relocating occurs without receiving instructions from an entity outside of the data center, and
if a determination is made that the threshold level is not satisfied, adjusting execution of the hosted service without relocating the hosted service to the new data center, wherein the adjusting occurs without receiving instructions from the entity outside of the data center.

7. The system of claim 6, wherein determining that the threshold level is satisfied comprises determining that an extreme performance degradation exists.

8. The system of claim 6, wherein ignoring the performance degradation comprises waiting for a future iteration of the monitoring data.

9. The system of claim 6, wherein ignoring the performance degradation comprises terminating analysis of the monitoring data.

10. The system of claim 6, wherein the congestion threshold comprises a plurality of threshold levels.

11. The system of claim 6, wherein the class of service threshold comprises a plurality of threshold levels.

12. A computer storage medium having computer-executable instructions stored thereon that, when executed by a processor, cause the processor to perform operations comprising:
receiving, in a data center, monitoring data that comprises congestion data and class of service data, wherein the data center further comprises resources that host a hosted service, wherein the monitoring data is received from a computing device that operates outside of the data center, wherein the monitoring data relates to traffic on a network path between a customer and the hosted service at the data center, wherein the congestion data describes congestion perceived by the customer, and wherein the class of service data describes class of service perceived by the customer;

determining, based on analyzing the monitoring data, that a performance degradation exists for the traffic on the network path, wherein determining that the performance degradation exists comprises determining that a performance threshold is satisfied by one of determining that a congestion threshold is satisfied or determining that a class of service threshold is satisfied;

in response to a determination that the performance threshold is satisfied, determining if the performance threshold has been satisfied a defined number of times specified by a cycle threshold, and wherein the cycle threshold is not satisfied if the performance threshold has not been satisfied the defined number of times defined by the cycle threshold;

if a determination is made that the cycle threshold is not satisfied, ignoring the performance degradation;

in response to determining that the cycle threshold is satisfied, determining if a time threshold is satisfied, wherein the time threshold is satisfied if the performance threshold is satisfied the defined number of times during a period of time defined by the time threshold, and wherein the time threshold is not satisfied if the performance threshold is not satisfied the defined number of times during the period of time defined by the time threshold;

if a determination is made that the time threshold is not satisfied, ignoring the performance degradation, whereby the performance degradation is ignored until the performance threshold is satisfied, during the period of time defined by the time threshold, the defined number of times;

in response to a determination that the time threshold is satisfied, determining if a threshold level is satisfied by the monitoring data;

if a determination is made that the threshold level is satisfied, relocating, by the processor, the hosted service to a new data center, wherein the relocating occurs without receiving instructions from an entity outside of the data center; and if a determination is made that the threshold level is not satisfied, adjusting execution of the hosted service without relocating the hosted service to the new data center, wherein the adjusting occurs without receiving instructions from the entity outside of the data center.

13. The computer storage medium of claim 12, wherein determining that the threshold level is satisfied comprises determining that an extreme performance degradation exists.

14. The computer storage medium of claim 12, wherein ignoring the performance degradation comprises waiting for a future iteration of the monitoring data.

15. The computer storage medium of claim 12, wherein ignoring the performance degradation comprises terminating analysis of the monitoring data.

16. The method of claim 1, wherein the processor is configured to adjust the execution of the hosted service autonomously to provide a closed control loop for the data center.

17. The method of claim 1, wherein the processor is configured to relocate the hosted service to the new data center autonomously to provide a closed control loop for the data center.

18. The system of claim 6, wherein the processor is configured to adjust the execution of the hosted service autonomously to provide a closed control loop for the data center.

19. The system of claim 6, wherein the processor is configured to relocate the hosted service to the new data center autonomously to provide a closed control loop for the data center.

20. The computer storage medium of claim 12, wherein the processor is configured to adjust the execution of the hosted service autonomously to provide a closed control loop for the data center, and wherein the processor is configured to relocate the hosted service to the new data center autonomously to provide the closed control loop for the data center.

* * * * *